United States Patent

Yoshikawa et al.

[11] Patent Number: 5,443,412
[45] Date of Patent: Aug. 22, 1995

[54] BLASTING MACHINING APPARATUS USING ABRASIVE PARTICLES LIKE POWDER

[75] Inventors: Takashi Yoshikawa, Kanagawa; Shigeo Kobayashi, Chiba, both of Japan

[73] Assignee: Sony Corpoation, Tokyo, Japan

[21] Appl. No.: 312,174

[22] Filed: Sep. 26, 1994

Related U.S. Application Data

[63] Continuation of Ser. No. 943,491, Sep. 11, 1992, abandoned.

[30] Foreign Application Priority Data

Sep. 20, 1991 [JP] Japan .................................. 3-270391

[51] Int. Cl.⁶ ............................................. B24B 49/00
[52] U.S. Cl. .................................... 451/5; 451/11; 451/65; 451/80; 29/564; 29/33 P
[58] Field of Search ............. 451/75, 80, 87, 65, 451/67, 38, 39, 40, 5, 11; 29/33 P, 564, 650

[56] References Cited

U.S. PATENT DOCUMENTS

| | | | |
|---|---|---|---|
| 4,651,472 | 3/1987 | Scheder et al. | 51/165.73 |
| 4,869,025 | 9/1989 | Hill et al. | 51/122 |
| 4,882,881 | 11/1989 | Van Kuiken et al. | 51/426 |

Primary Examiner—Maurina T. Rachuba
Attorney, Agent, or Firm—Jay H. Maioli

[57] ABSTRACT

A blasting machining apparatus for blasting a workpiece by using fine abrasive particles. The blasting machining apparatus includes a first arm for supplying the workpiece onto a table provided in a blasting chamber and discharging the workpiece after being blasted out of the blasting chamber and a second arm for supplying the workpiece after being blasted and discharged out of the blasting chamber into a washing unit and discharging the work after being washed out of the washing unit. The first arm and the second arm are independent of each other. Accordingly, after washing the workpiece, washer liquid attached to the second arm does not fall into the blasting chamber, thereby ensuring stable blasting of the workpiece in the blasting chamber.

4 Claims, 5 Drawing Sheets

BLASTING MACHINING APPARATUS USING ABRASIVE PARTICLES LIKE POWDER

This is a continuation of application Ser. No. 07/943,491 filed Sept. 11, 1992, now abandoned.

BACKGROUND OF THE INVENTION

The present invention relates to a blasting machining apparatus for blasting a surface of a work by using abrasive particles like powder.

As an example of such a blasting machining apparatus, a sand blasting apparatus is well known in the art. The sand blasting apparatus uses particles (abrasive particles) having a particle size of normally 50 μm or more. To effect fine blasting, the particle size must be reduced. In the case of using such abrasive particles having a reduced particle size, the abrasive particles remain on a surface of a work after blasted. Accordingly, the work after being blasted is washed by air blowing. However, the abrasive particles attached to the work cannot be completely blown off. To cope with this, it is known to use a washing equipment storing a washer liquid for washing the work after blasted.

In such a blasting machining apparatus using the washing equipment, a single arm is provided to supply the work to be blasted into a blasting chamber and carry the work after being blasted to the washing equipment. However, after washing the work carried by the arm, the washer liquid is attached to the arm. Thereafter, when a new work to be blasted is supplied again by the arm into the blasting chamber, there is a possibility that the washer liquid attached to the arm falls into the blasting chamber. As a result, the abrasive particles in the blasting chamber are wetted by the moisture due to the washer liquid to cause choking of a nozzle provided in the blasting chamber for supplying the abrasive particles.

SUMMARY OF THE INVENTION

It is accordingly an object of the present invention to provide a blasting machining apparatus using abrasive particles like powder which can prevent that the washer liquid attached to the arm after washing the work falls into the blasting chamber, thereby ensuring stable blasting in the blasting chamber.

According to the present invention, there is provided a blasting machining apparatus using abrasive particles like powder, comprising a blasting chamber in which a work is blasted by said abrasive particles; a nozzle provided in said blasting chamber for supplying said abrasive particles to said work; a table provided in said blasting chamber for placing thereon said work; washing means provided adjacent to said blasting chamber for washing said work after being blasted; first carrier means for supplying said work to be blasted onto said table in said blasting chamber and discharging said work after being blasted out of said blasting chamber; and second carrier means for supplying said work after being blasted and discharged out of said blasting chamber into said washing means and discharging said work after washed out of said washing means.

With this construction, the first carrier means and the second carrier means are independent of each other. Accordingly, after washing the work, a washer liquid attached to the second carrier means does not fall into the blasting chamber. That is, the first carrier means is not wetted by the washer liquid. Therefore, when a new work is carried by the first carrier means into the blasting chamber, the abrasive particles in the blasting chamber are not wetted by the moisture due to the washer liquid, thereby keeping the quality of the abrasive particles stable and ensuring precise blasting of the work.

Other objects and features of the invention will be more fully understood from the following detailed description and appended claims when taken with the accompanying drawings.

DETAILED DESCRIPTION OF THE PREFERRED EMBODIMENTS

Figure 1:
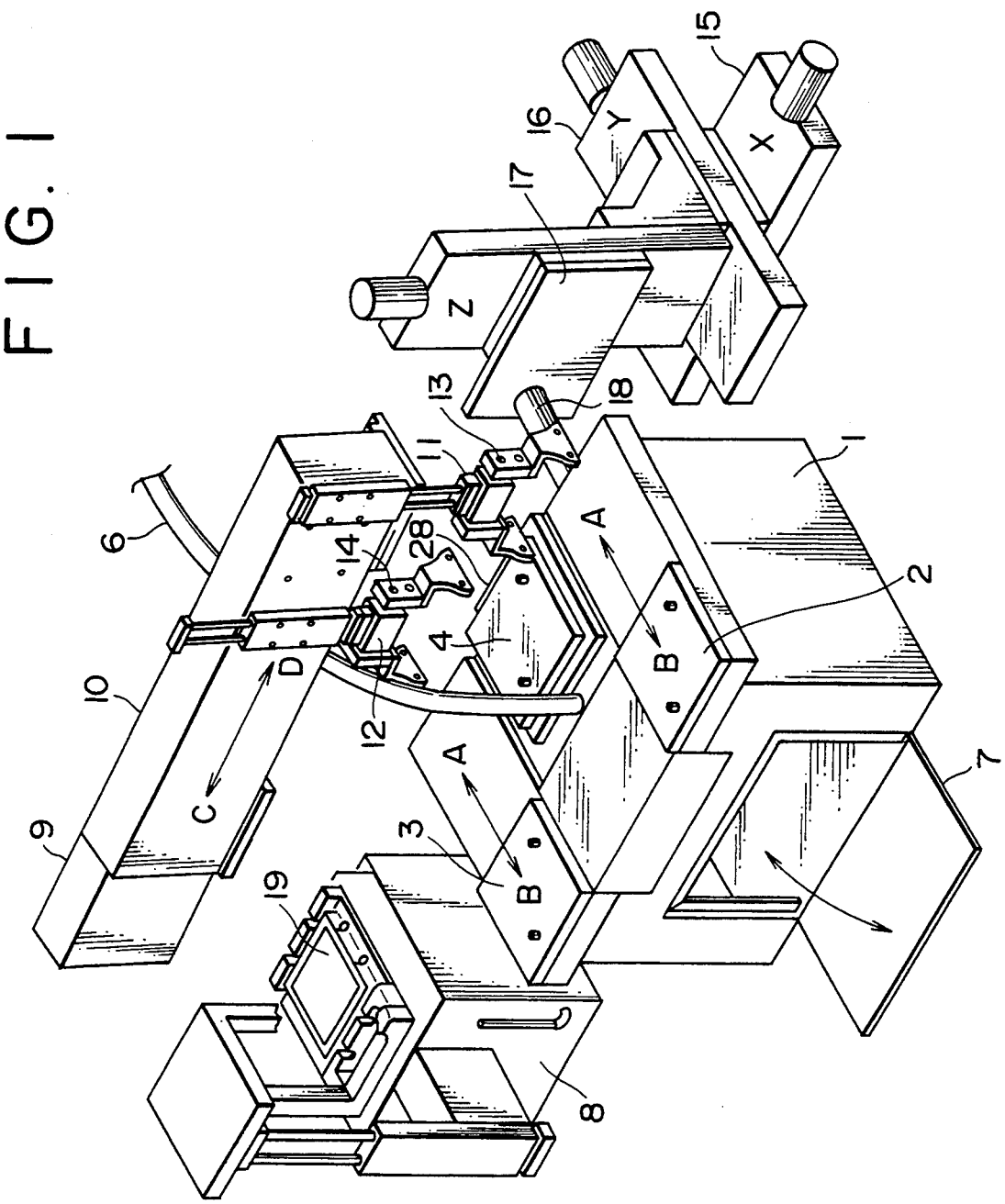
FIG. 1 is a perspective view of a blasting machining apparatus according to a preferred embodiment of the present invention.
Figure 2:
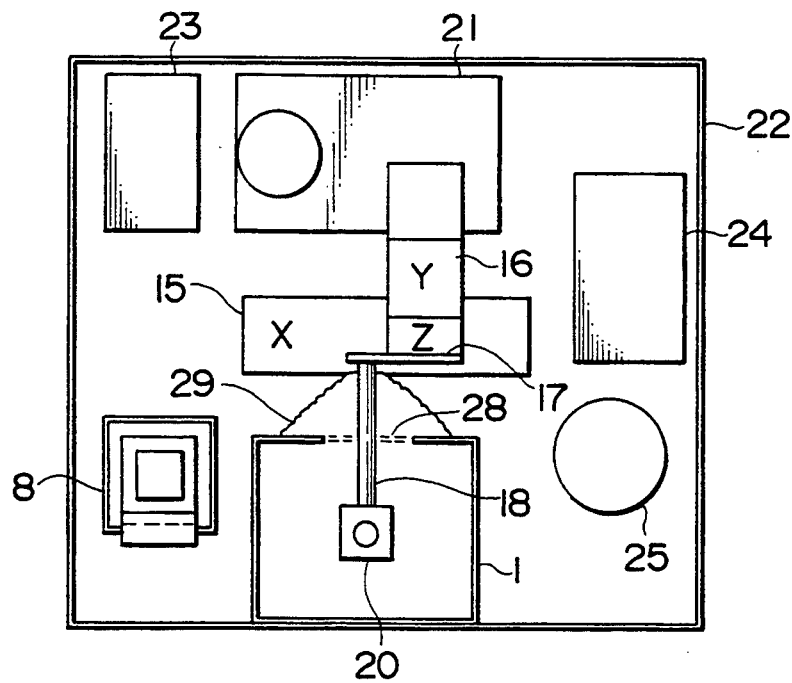
FIG. 2 is a plan view of FIG. 1.
Figure 3:
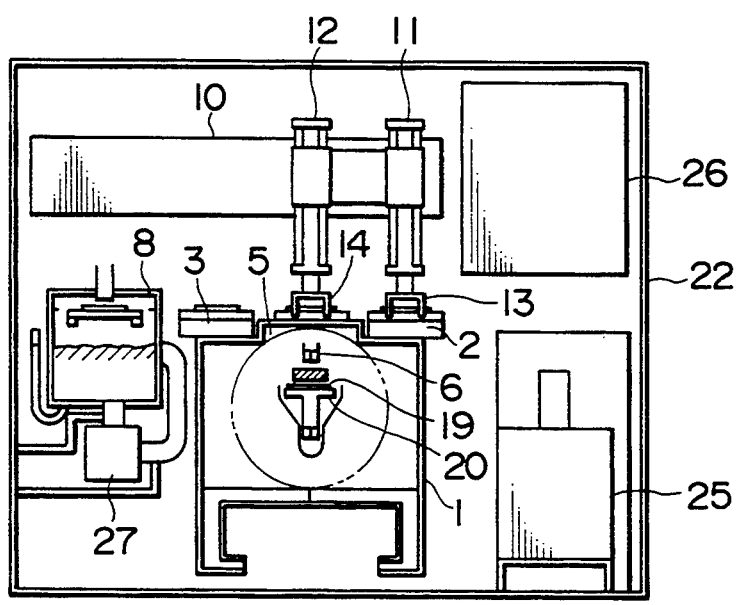
FIG. 3 is an elevational view of FIG. 1.
Figure 4:
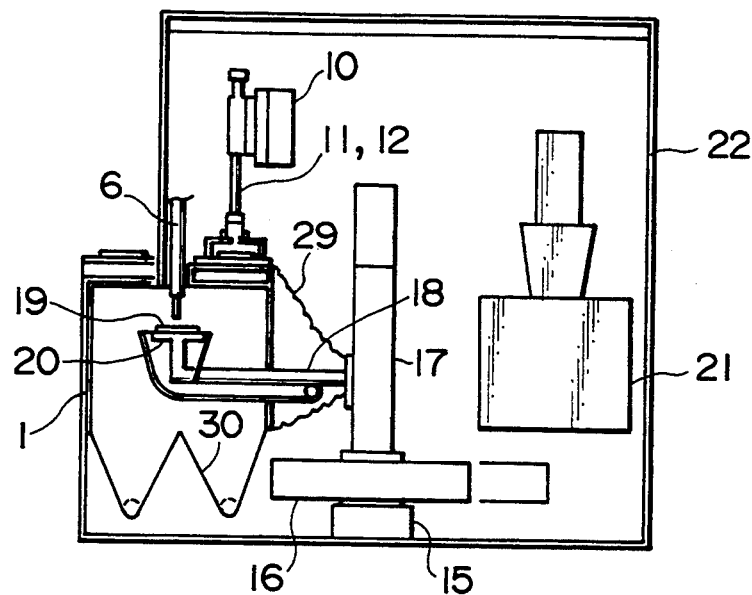
FIG. 4 is a right side view of FIG. 1.
Figure 5:
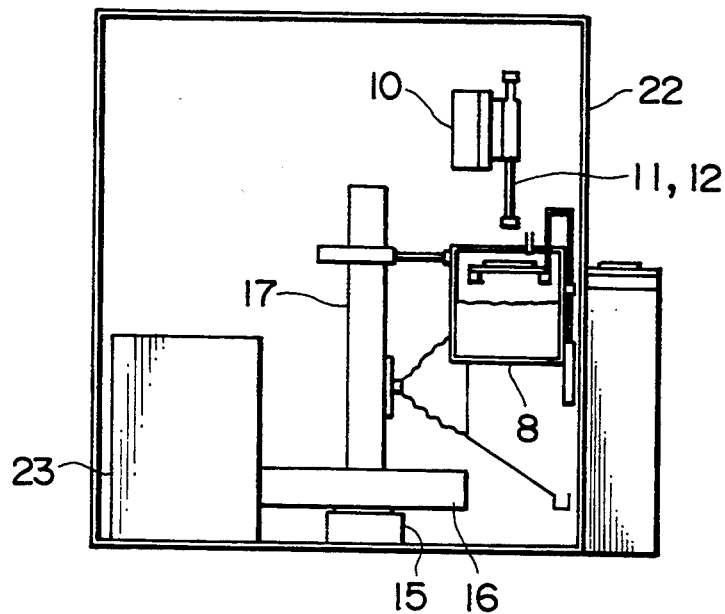
FIG. 5 is a left side view of FIG. 1.

There will now be described a preferred embodiment of the present invention with reference to the drawings.

Referring to FIGS. 1 to 5, reference numeral 1 generally designates a box-shaped blasting chamber adapted to be sealed. On an upper surface of the blasting chamber 1 at right and left portions thereof, there are movably mounted a supply tray 2 for placing thereon a work 19 to be supplied into the blasting chamber 1 and a discharge tray 3 for placing thereon the work 19 discharged out of the blasting chamber 1, respectively. Both the supply tray 2 and the discharge tray 3 are individually movable in horizontal opposite directions as depicted by arrows A and B in FIG. 1 by driving means (not shown). The upper surface of the blasting chamber 1 is formed at its rear portion with an opening 5 adapted to be covered with a shutter 4. That is, the opening 5 is formed between the supply tray 2 and discharge tray 3 in their rearward moved positions in the direction of the arrow A. Just before the opening 5 at a central position of the upper surface of the blasting chamber 1, there is mounted one end portion of a nozzle 6 for supplying abrasive particles into the blasting chamber 1. On a front surface of the blasting chamber 1, there is openably mounted a cover 7 for use in replacement of optional parts.

On the left side of the blasting chamber 1 in adjacent relationship thereto, there is provided an ultrasonic washing unit 8 as the washing means for washing the work 19 after being blasted in the blasting chamber 1. Over the blasting chamber and the ultrasonic washing unit 8, there is provided a carrier beam 10 movable along a guide rail 9 in horizontal opposite directions as depicted by arrows C and D in FIG. 1. A first arm 11 and a second arm 12 are mounted on the carrier beam 10 so as to be individually movable in vertical opposite directions by driving sources (not shown). The first arm 11 is provided at its lower end with a chuck 13 for gripping the work 19 to be supplied into the blasting chamber 1 and to be discharged therefrom. Similarly, the second arm 12 is provided at its lower end with a chuck 14 for gripping the work 19 to be supplied into the ultrasonic washing unit 8 and to be discharged therefrom.

Figure 6:
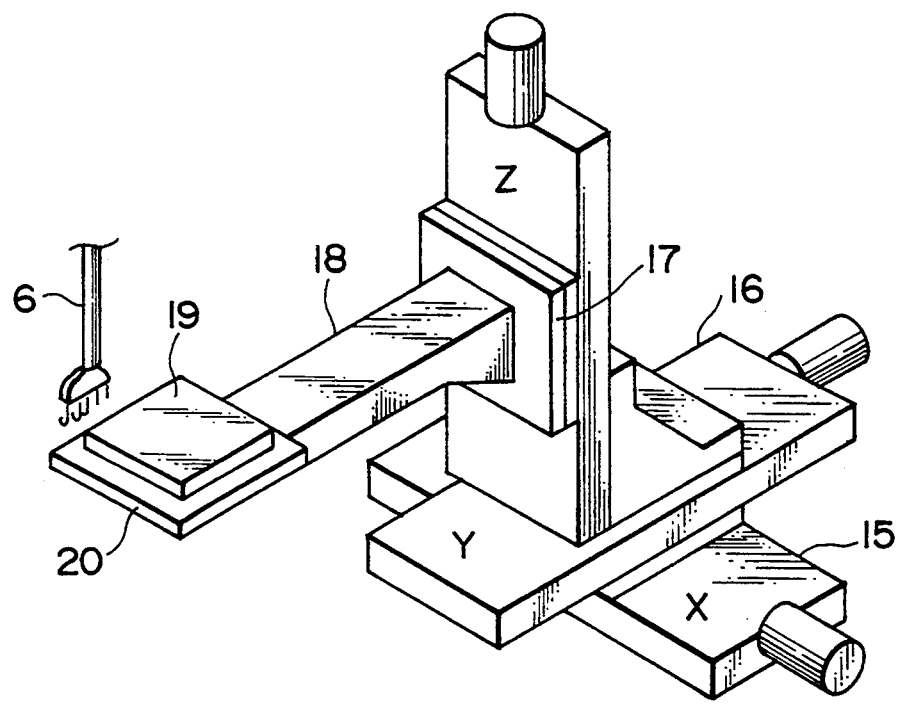
FIG. 6 is a perspective view of X-, Y-, Z-axis tables shown in FIG. 1.

Behind the blasting chamber 1, there is provided an X-axis table 15 movable in the opposite directions of the arrows C and D. On the X-axis table 15, there is provided a Y-axis table movable in horizontal opposite directions perpendicular to the directions of the arrows C and D. On the Y-axis table there is provided a Z-axis table 17 movable in vertical opposite directions. As shown in FIG. 6, a horizontally extending table arm 18 is fixed at its one end to the Z-axis table 17, and a table 20 for placing thereon the work 19 in the blasting chamber is mounted at the other end of the table arm 18. These tables 15, 16 and 17 are controlled to be moved by a driving unit 21 shown in FIG. 2.

As shown in FIGS. 2 to 5, all of the above-mentioned members are accommodated in a housing 22 adapted to be sealed. There are further accommodated in the housing 22 an air drier unit 23, a dust collector unit 24, a work supply box 25, a control unit 26, and a washer liquid circulator pump 27. A rear surface of the blasting chamber 1 is formed with an opening 28 allowing movement of the table arm 18. The opening 28 is tightly sealed by a flexible sheet 29 closely fitted at its one end to the table arm 18. Further, a recovery section 30 for recovering the abrasive particles is provided at the bottom of the blasting chamber 1.

The operation of the above preferred embodiment will now be described. First, the work 19 is set on the supply tray 2. When a start switch (not shown) provided on the control unit 26 is pushed, the supply tray 2 is moved in the direction of the arrow A. Then, the first arm 11 is lowered to let the chuck 13 grip the work 19 set on the supply tray 2. Then, the carrier beam 10 is moved in the direction of the arrow C to move the work 19 gripped by the chuck 13 to a position just over the shutter 4. Then, the shutter 4 is opened, and the first arm 11 is lowered through the opening 5 into the blasting chamber 1 to set the work 19 on the table 20 positioned in the blasting chamber 1. Then, the work 19 is released from the chuck 13, and the first arm 11 is lifted to the outside of the blasting chamber 1. Then, the shutter 4 is closed. Thereafter, blasting of the work 19 is started.

The table 20 is adjusted in three-dimensional position by arbitrary movements of the X-, Y- and Z-axis tables 15, 16 and 17. That is, the movement of the X-axis table 16 provides the blasting under the conditions of preset scanning frequency and scanning speed on the same reciprocating locus as controlled by the driving unit 21; the movement of the Y-axis table 16 provides the blasting under the conditions of preset pitch and stroke as controlled by the driving unit 21; and the movement of the Z-axis table 17 provides the blasting under the condition of a preset gap between the work 19 and a tip of the nozzle 6 as controlled by the driving unit 21.

When the blasting ends, the shutter 4 is opened, and the first arm 11 is lowered to let the chuck 13 grip the work 19 that has been blasted. Then, the first arm 11 is lifted to the outside of the blasting chamber 1, and the shutter 4 is then closed. Then, the work 19 is placed on the shutter 4, and is released from the chuck 13. At the same time the first arm 11 is moved in the direction of the arrow D, the second arm 12 is moved in the same direction to a position just over the work 19 placed on the shutter 4. Then, the second arm 12 is lowered to let the chuck 14 grip the work 19. Then, the second arm 12 is moved in the direction of the arrow C to a position just over the ultrasonic washing unit 8. Then, the second arm 12 is lowered to enter the ultrasonic washing unit 8. Then, washing of the work 19 is started. When the washing is ended, the work 19 is dried with hot air, and it is then carried by the second arm 12 to the discharge tray 3 located in the rearward position. Then, the work 19 is released from the chuck 14, and the discharge tray 3 on which the work 19 is placed is moved in the direction of the arrow B, thus automatically discharging the work 19 after being washed.

According to the above preferred embodiment, the first arm 11 for supplying the work 19 to be blasted onto the table 20 positioned in the blasting chamber 1 and discharging the work 19 blasted out of the blasting chamber 1 is independent of the second arm 12 for supplying the work 19 blasted into the ultrasonic washing unit 8 and discharging the work 19 washed out of the ultrasonic washing unit 8. Accordingly, there is no possibility of the washer liquid falling into the blasting chamber 1. As a result, the quality of the abrasive particles can be kept stable to effect precise blasting. Further, there is no possibility of the nozzle 6 being choked by wet particles and operator's hands being stained for cleaning of the nozzle 6.

Figure 7:
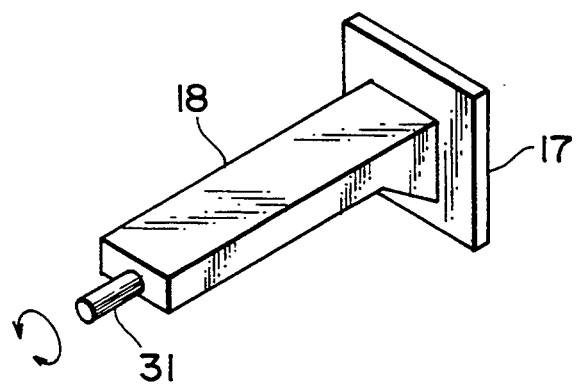
FIG. 7 is a perspective view of another preferred embodiment of a table arm shown in FIG. 6.
Figure 8:
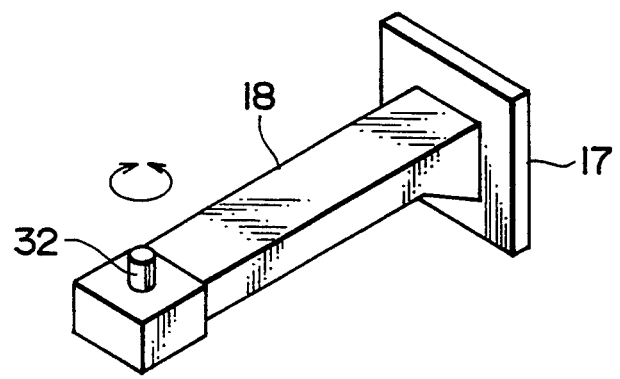
FIG. 8 is a perspective view of a further preferred embodiment of the table arm.

FIGS. 7 and 8 show other preferred embodiments of the table arm 18. In the preferred embodiment shown in FIG. 7, a horizontal pin 31 is provided at a front end of the table arm 18, and a table (not shown) is rotatably mounted on the horizontal pin 31. In the preferred embodiment shown in FIG. 8, a vertical pin 32 is provided at the front end of the table arm 18, and a table (not shown) is rotatably mounted on the vertical pin 32. Accordingly, in both the preferred embodiments shown in FIGS. 7 and 8, a work can be blasted as it is being rotated. Further, although not shown, a dust sensor may be provided in the periphery of the blasting chamber 1, so that when the dust sensor detects leakage of the abrasive particles out of the blasting chamber 1, the apparatus may be stopped.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. A blasting machining apparatus using abrasive particles having a particle size of less than 50 $\mu$m for blasting a surface of an object, comprising:

a blasting chamber in which an object is blasted by said abrasive particles;

a nozzle provided in said blasting chamber for supplying said abrasive particles to said object;

a table provided in said blasting chamber for placing said object thereon;

washing means provided adjacent to said blasting chamber for washing said object after being blasted;

first carrier means moveable into and out of said blasting chamber for supplying said object to be blasted onto said table in said blasting chamber and discharging said object after being blasted out of said blasting chamber to a position outside of said blasting chamber; and second carrier means independent of said first carrier means and moveable between said outside position and said washing means for supplying said object after being blasted and discharged out of said blasting chamber into said washing means and discharging said object after being washed back out of said washing means, wherein said first carrier means does not contact said object after it has been washed and said second carrier means does not contact said blasting chamber.

2. The blasting machine apparatus as defined in claim 1, wherein said first carrier means comprises a horizontally movable beam extending between and over said blasting chamber and said washing means, a first arm vertically movably mounted on said beam, and a first chuck mounted at a lower end of said first arm for gripping said object to be supplied into and to be discharged out of said blasting chamber; and said second carrier means comprises said beam, a second arm vertically movably mounted on said beam, and a second chuck mounted at a lower end of said second arm for gripping said object to be supplied into and to be discharged out of said washing means.

3. The blasting machining apparatus as defined in claim 1, further comprising means for moving said table in X, Y and Z directions perpendicular to one another, thereby adjusting said work on said table in three-dimensional position.

4. The blasting machining apparatus as defined in claim 1, further comprising a housing to be sealed for accommodating said blasting chamber, said washing means, said first carrier means and said second carrier means.

* * * * *